United States Patent [19]

Miura et al.

[11] Patent Number: 5,082,892

[45] Date of Patent: Jan. 21, 1992

[54] NOVEL RESIN COMPOSITION AND CHASSIS FOR ELECTRONIC INSTRUMENTS SHAPED THEREFROM

[75] Inventors: Yoshiaki Miura, Sodegaura; Masami Mihara; Hidezo Hosomi, both of Ichihara, all of Japan

[73] Assignee: Idemitsu Petrochemical Company, Ltd., Tokyo, Japan

[21] Appl. No.: 485,222

[22] Filed: Feb. 26, 1990

[30] Foreign Application Priority Data

Mar. 2, 1989 [JP] Japan .................................. 1-48579
Mar. 23, 1989 [JP] Japan .................................. 1-69308

[51] Int. Cl.$^5$ ........................ C08L 39/04; C08L 37/00
[52] U.S. Cl. .................................. 524/516; 524/494; 524/517; 524/409
[58] Field of Search ............... 524/505, 516, 517, 409; 525/191, 205, 207

[56] References Cited

U.S. PATENT DOCUMENTS

| | | | |
|---|---|---|---|
| 4,097,550 | 6/1978 | Haaf et al. | 524/505 |
| 4,339,376 | 7/1982 | Kasahara | 524/505 |
| 4,458,046 | 7/1984 | Hornbaker et al. | 525/205 |
| 4,483,949 | 11/1984 | Semen | 524/505 |
| 4,491,648 | 1/1985 | Durbin | 524/505 |
| 4,493,919 | 1/1985 | Durbin | 524/505 |
| 4,912,144 | 3/1990 | McCready | 524/505 |

FOREIGN PATENT DOCUMENTS 55-161836 12/1980 Japan .

*Primary Examiner*—Paul R. Michl
*Assistant Examiner*—Yong S. Lee
*Attorney, Agent, or Firm*—Wyatt, Gerber, Burke and Badie

[57] ABSTRACT

A glass fiber-reinforced synthetic resin composition is proposed which is particularly suitable as a molding material of chassis of electric and electronic instruments to satisfy the various requirements in this particular application. The resin composition comprises: (A) 100 parts by weight of a copolymeric resin of styrene and maleic anhydride or a derivative thereof, of which the molar fraction of the moiety of maleic anhydride or a derivative thereof is in the range from 3 to 20%; (B) from 1 to 30 parts by weight of a styrene-based thermoplastic elastomer, of which the weight fraction of the moiety of styrene is in the range from 5 to 50%; (C) from 5 to 80 parts by weight of glass fibers, (D) from 5 to 30 parts by weight of a bromine-containing organic compound as a flame retardant; and (E) from 2 to 15 parts by weight of antimony trioxide.

7 Claims, No Drawings

NOVEL RESIN COMPOSITION AND CHASSIS FOR ELECTRONIC INSTRUMENTS SHAPED THEREFROM

BACKGROUND OF THE INVENTION

The present invention relates to a novel synthetic resin composition or, more particularly, to a synthetic resin composition particularly suitable as a molding material of chassis for electric and electronic instruments having outstandingly high heat resistance, rigidity and dimensional stability as well as to a chassis molded from the resin composition.

As is known, many of chassis in electric and electronic instruments are shaped from a synthetic resin composition. Essential requirements for such a resin-made chassis include high heat resistance, flame retardancy, rigidity and dimensional stability. Currently, the resin compositions directed to this application are mainly composed of a polycarbonate resin, polysulfone resin and the like belonging to the class of so-called engineering plastics and glass fibers as a reinforcing material. These engineering plastics, however, are generally expensive so that the costs for the preparation of chassis from the resin composition are also unavoidably high not to be economical.

Accordingly, it is proposed to use a glass fiber-reinforced resin composition comprising a polystyrene resin modified with an acid anhydride monomer as a class of less expensive plastic resins (see, for example, Japanese Patent Publication 49-19097). Though somewhat improved in respect of the impact strength, such a resin composition has a problem that the shaped article such as chassis prepared therefrom sometimes suffers appearance of crazes because of the formation of microscopic interstices between the matrix phase of the resin and the surface of the glass fibers.

SUMMARY OF THE INVENTION

The present invention accordingly has an object to provide a chassis for electric and electronic instruments free from the above described problems and disadvantages in the prior art products prepared from conventional synthetic resin compositions reinforced with glass fibers in connection with heat resistance, rigidity, dimensional stability and appearance of crazes as well as costs or, in particular, to provide a novel synthetic resin composition suitable as a material of chassis in electric and electronic instruments.

Thus, the synthetic resin composition provided by the invention comprises, as a blend:

(A) 100 parts by weight of a copolymeric resin of styrene and maleic anhydride or a derivative thereof, of which the molar fraction of the moiety of maleic anhydride or a derivative thereof is in the range from 3 to 20%;

(B) from 1 to 30 parts by weight of a styrene-based thermoplastic elastomer, of which the weight fraction of the moiety of styrene is in the range from 5 to 50%; and (C) from 5 to 80 parts by weight of glass fibers.

Preferably, the above defined inventive synthetic resin composition further comprises:

(D) from 5 to 30 parts by weight of a bromine-containing organic compound as a flame retardant; and (E) from 2 to 15 parts by weight of antimony trioxide.

The chassis of the invention for electric and electronic instruments can be obtained by molding the above defined synthetic resin composition.

DETAILED DESCRIPTION OF THE PREFERRED EMBODIMENTS

As is described above, the essential ingredients in the inventive synthetic resin composition are the components (A), (B) and (C) or, preferably, the components (A), (B), (C), (D) and (E) each in a specified weight proportion. In the thus formulated resin composition, the affinity or wettability between the matrix resin and the surface of the glass fibers is greatly improved so that the chassis molded from the resin composition is free from the problem of appearance of crazes along with the high heat resistance, rigidity and dimensional stability and can be prepared with outstandingly low costs.

In the following, detailed description is given for each of the components comprised in the inventive resin composition.

The component (A) is a copolymeric resin of styrene and a maleic anhydride monomer, i.e. maleic anhydride or a derivative thereof such as maleimide. It is essential in the component (A) that the molar fraction of the moiety of the maleic anhydride monomer in the copolymer is in the range from 3 to 20% or, preferably, in the range from 5 to 15%, the balance being the moiety of the styrene monomer. When the molar fraction of the moiety of the maleic anhydride monomer is too small, the resin composition cannot be imparted with high heat resistance. When the molar fraction thereof is too large, on the other hand, the shaped articles of the resin composition may have poor impact strength. It is optional that two kinds or more of such copolymeric resins of styrene and a maleic anhydride monomer can be used in combination as the component (A).

The above mentioned copolymeric resins of styrene and a maleic anhydride monomer as the component (A) can be prepared by the copolymerization of the monomer mixture according to a known procedure of bulk polymerization or solution polymerization. Although the polymerization reaction can be completed by using a single polymerization reactor, it is preferable to conduct the polymerization by the method of continuous multi-stage process using a sequence of a plural number of polymerization reactors connected in series. In this continuous multi-stage polymerization process, each of the polymerization reactors succeeding the first reactor is fed with styrene and the polymerization mixture coming from the preceding reactor each at a controlled rate, optionally, as well as the maleic anhydride monomer, i.e. maleic anhydride, maleimide and the like.

It is of course optional in the invention that two kinds or more of different copolymers of styrene and a maleic anhydride monomer can be used in combination as the component (A).

The component (B) comprised in the inventive resin composition is a styrene-based thermoplastic elastomer such as MBS (copolymer of methyl methacrylate, butadiene and styrene), SBS, SIS, SEBS and the like, of which MBS is preferred. The weight fraction of the styrene moiety in the syrene-based thermoplastic elastomer is in the range from 5 to 50% or, preferably, in the range from 10 to 30%. It is preferable to use an MBS consisting of from 50 to 80% by weight of the butadiene moiety, from 10 to 25% by weight of the styrene moiety and from 10 to 25% by weight of the methyl methacrylate moiety. When the weight fraction of the styrene moiety in the elastomer is too low, the elastomer would be poorly dispersible in the resin composition to cause a decrease in the rigidity of the articles shaped from the resin composition. When the weight fraction of the styrene moiety is too high, on the other hand, a decrease may be caused in the interfacial affinity between the resin matrix and the surface of the glass fibers also to cause a decrease in the rigidity of the articles shaped from the resin composition.

It is of course optional in the invention that two kinds or more of different styrene-based thermoplastic elastomers are used in combination according to need. The amount of the styrene-based thermoplastic elastomer as the component (B) in the inventive resin composition is in the range from 1 to 30 parts by weight or, preferably, from 5 to 20 parts by weight per 100 parts by weight of the copolymer of styrene and a maleic anhydride monomer as the component (A). When the amount of the component (B) is too small, articles shaped from the resin composition may suffer appearance of crazes. When the amount of the component (B) is too large, on the other hand, a decrease is caused as a trend in the rigidity and heat resistance of the articles shaped from the resin composition.

Glass fibers are used as the component (C) in the inventive resin composition. The type of the glass from which the glass fibers are made is not particularly limitative including high-alkali glass, low-alkali glass and alkali-free glass. The glass fibers can be compounded with the resinous matrix in various forms including rovings, chopped strands, milled fibers and the like. The fiber diameter of the glass fibers is, for example, in the range from 5 to 15 $\mu$m. A preferable type of the glass fibers is the form of chopped strands obtained by binding 100 to 1000 glass fibers after a surface treatment by using a suitable binding agent into a strand and chopping the thus obtained glass fiber strands in a length of, for example, 0.1 to 6 mm. The above mentioned surface treatment of glass fibers can be performed by using a known coupling agent such as silane-based, titanate-based, borane-based, aluminum-containing, chromium-containing and zirconium-containing ones, of which silane-based coupling agents are preferred.

Examples of the silane-based coupling agents include: triethoxy silane; vinyl tris ($\beta$-methoxyethoxy) silane; 3-methacryloxypropyl trimethoxy silane; 3-glycidyloxypropyl trimethoxy silane; 2-(3,4-epoxycyclohexyl)ethyl trimethoxy silane; N-(2-aminoethyl)-3-aminopropyl trimethoxy silane; N-(2-aminoethyl)-3-aminopropyl methyl dimethoxy silane; 3-aminopropyl triethoxy silane; N-phenyl-3-aminopropyl trimethoxy silane; 3-mercaptopropyl trimethoxy silane; 3-chloropropyl trimethoxy silane and the like, of which 3-aminopropyl triethoxy silane and N-(2-aminoethyl)-3-aminopropyl trimethoxy silane are preferred.

Examples of the titanate-based coupling agents include: isopropyl triisostearoyl titanate; isopropyl tridecylbenzene sulfonyl titanate; isopropyl tris(dioctyl pyrophosphato) titanate; tetraisopropyl bis(dioctylphosphito) titanate; tetraoctyl bis(ditridecyl phosphito) titanate; tetra(2,2-diallyloxymethyl-1-butyl) bis(ditridecyl) phosphite titanate; bis(dioctyl pyrophosphato) oxyacetate titanate; bis(dioctyl pyrophosphato)ethylene titanate; isopropyl trioctanoyl titanate; isopropyl dimethacryl isostearoyl titanate; isopropyl isostearoyl diacryl titanate; isopropyl tri(dioctyl phosphato) titanate; isopropyl tricumylphenyl titanate; isopropyl tri(N-amidoethyl aminoethyl) titanate; dicumylphenyloxy acetate titanate; diisostearoyl ethylene titanate and the like, of which isopropyl triisostearoyl titanate and isopropyl tri(N-amidoethyl aminoethyl) titanate are preferred.

The method for the surface treatment of glass fibers with the above mentioned surface treatment agent is not particularly limitative and can be any of conventional methods including the aqueous solution method, organic solution method, spraying method and the like.

The binding agents used in the preparation of strands from glass fibers can be any of urethane-based, acrylic, butadiene-based and epoxy-based ones, of which urethane-based binding agents are preferred. The urethane-based binding agent usually contains at least 50% by weight of a polyisocyanate obtained by the polyaddition reaction of a diisocyanate compound and a polyhydric alcoholic compound. One-package type preparations such as oil-modified, moisture-curable and block-type ones as well as two-package type preparations such as catalyst-curable and polyol-curable ones are commercially available and any of them can be used without particular limitations.

The diisocyanate compound used as one of the reactants in the preparation of the polyisocyanate is exemplified by tolylene diisocyanate, diphenylmethane diisocyanate, naphthylene diisocyanate, hexamethylene diisocyanate, isophorone diisocyanate, 2,2,4-trimethyl hexamethylene diisocyanate, xylylene diisocyanate and the like while the polyhydric alcohol as the other reactant is exemplified by trimethylol propane, glycols and the like.

The method for the preparation of glass fiber strands by using the binding agent is not particularly limitative and any of conventional methods is applicable thereto including the methods of dip coating, roller coating, ejecting coating, spray coating, flow coating and the like.

The amount of the glass fibers as the component (C) compounded in the inventive resin composition is in the range from 5 to 80 parts by weight or, preferably, from 20 to 60 parts by weight per 100 parts by weight of the component (A). When the amount of the glass fibers is too small, the articles shaped from the resin composition would be poor in the mechanical properties or, in particular, in the rigidity. When the amount of the glass fibers is too large, on the other hand, difficulties are encountered in the compounding works of the resin composition and, even if it ever could be obtained, the resin composition would have extremely low workability in molding.

The resin composition which is particularly suitable as a molding material of chassis of electric and electronic instruments according to the invention can optionally be admixed according to need with various kinds of known additives each in a limited amount inclusing inorganic fillers, such as calcium carbonate, calcium sulfate, barium sulfate, aluminum hydroxide, talc, clay, mica, silica, diatomaceous earth, montmorillonite, bentonite, zinc borate, barium metaborate and the like, as well as lubricants, antioxidants, plasticizers, flame retardants, photostabilizers, coloring agents, antistatic agents and so on.

Examples of the above mentioned lubricants include stearic acid, behenic acid, stearoamide, methylene bisstearoamide, ethylene bisstearoamide and the like. Examples of the antioxidants include hindered phenol-type ones such as 2,6-di-tert-butyl-4-methyl phenol, stearyl-2-(3,5-di-tert-butyl-4-hydroxy phenyl) propionate, tri-ethylene glycol bis-3-(3-tert-butyl-4-hydroxy-5-methyl phenyl) propionate and the like and phosphorus-containing ones such as tri(2,4-di-tert-butyl phenyl) phosphite, 4,4'-butylidene bis(3-methyl-6-tert-butylphenyl-ditridecyl) phosphite and the like. Examples of the plasticizers include mineral oils, polyethylene glycols and the like. Examples of the flame retardants include bromine-containing organic compounds such as tetrabromo bisphenol A, tetrabromo bisphenol S, bis(tribromophenoxy) ethane, poly(dibromo phenylene oxide), decabromo diphenyl oxide, octabromo diphenyl oxide, poly(tribromo styrene), brominated polycarbonates and the like as well as antimony trioxide. Combinations of a bromine-containing organic compound and antimony trioxide are particularly effective as the flame retardant compounded in the inventive resin composition. The antimony trioxide used as a flame retardant is not particularly limitative in respect of the quality thereof and any commercially available products of antimony trioxide can be used. The amounts of the bromine-containing organic compound as the component (D) and the antimony trioxide as the component (E) in the inventive composition are in the ranges from 5 to 30 parts by weight and from 2 to 15 parts by weight, respectively, per 100 parts by weight of the component (A).

The resin composition of the invention can be prepared by compounding the above described components (A), (B) and (C) together with or without the components (D) and (E) as well as other optional additives in a method conventionally undertaken in the preparation of glass fiber-reinforced composite styrene-based resin compositions. For example, the essential and optional components each in a specified amount are introduced into and blended in a suitable blending machine such as V-blenders, ribbon blenders, Henschel mixers, tumbler blenders and the like. If necessary, the thus obtained blend is further kneaded under melting of the resin in a suitable kneading machine such as Banbury mixers, kneaders, oven rollers, single-screw extruders, double-screw extruders, reciprocating single-screw extruders and the like.

The thus prepared resin composition of the invention can be molded and shaped into a desired form of a chassis for electric and electronic instruments by a known molding method such as injection molding, extrusion molding, compression molding and the like.

In the following, the present invention is described in more detail by way of examples although the invention is never limited by these examples.

In the following example, the shaped articles of the resin compositions were evaluated for the respective items according to the procedures and criteria shown below. The term of "parts" in the following always refers to "parts by weight".

(1) Occurrence of crazes

A ¼-inch thick bar shaped from the resin composition was cut along the longitudinal direction and the cross sectional surfaces were polished and visually examined for the appearance of crazes, i.e. streaky cracks. The results were given in three ratings of A, B and C according to the following criteria.

A: no crazes detected
B: tiny crazes detected
C: many large crazes detected (2) Flexural strength Measurement of the flexural strength was made according to the procedure specified in JIS K 7203. A flexural strength of 1000 kg/cm$^2$ at 100° C. gave a demarcation between acceptable and unacceptable shaped articles.

(3) Molding shrinkage

Measurement of the molding shrinkage was made according to the procedure specified in ASTM D955. A molding shrinkage of 0.4% gave a demarcation between acceptable and unacceptable shaped articles.

(4) Linear thermal expansion coefficient

Measurement of the linear thermal expansion coefficient was made according to the procedure specified in ASTM D696. A linear thermal expansion coefficient of $5.0 \times 10^{-5}$ cm/cm/° C. gave a demarcation between acceptable and unacceptable shaped articles.

(5) Izod impact strength

Measurement of the Izod impact strength was made according to the procedure specified in JIS K 7110.

(6) Flame retardancy

The flame retardancy was measured and evaluated according to UL94 for the thickness of 1/12 inch.

(7) Flexural modulus

Measurement of the flexural modulus was made according to the procedure specified in JIS K 7203.

(8) Heat distortion temperature

Measurement of the heat distortion temperature was made according to the procedure specified in JIS K 7207.

In the following description, the components compounded to prepare the resin composition are indicated by the symbols shown below.

(A) Copolymeric resins of styrene and a maleic anhydride monomer

A-1: a copolymer consisting of 86% by moles of styrene moiety and 14% by moles of maleic anhydride moiety having a melt index (MI) of 1.3 g/10 minutes at 230° C. and under a load of 2.16 kg A-2: a copolymer consisting of 93% by moles of styrene moiety and 7% by moles of maleic anhydride moiety having a melt index (MI) of 1.2 g/10 minutes at 230° C. and under a load of 2.16 kg (B) Elastomers B-1: MBS (Metablen C-223, a product by Mitsubishi Rayon Co.), content of styrene moiety 15% by weight B-2: SBS (TR-1184, a product by Shell Chemical Co.), content of styrene moiety 30% by weight B-3: MBS (Paralloid KM-653, a product by Rohm and Haas Co.)

B-4: BR (Asaprene 700A, a product by Asahi Chemical Industry Co.), containing no styrene moiety (C) Glass fibers C-1: chopped glass fiber strands prepared by using a urethane-based binding agent after treatment of the glass fibers with an aminosilane coupling agent, having a fiber diameter of 13 μm and length of 3 mm C-2: chopped glass fiber strands prepared by using a urethane-acrylic binding agent after treatment of the glass fibers with an aminosilane coupling agent, having a fiber diameter of 13 μm and length of 3 mm (D) Other additives D-1: decabromo diphenyl oxide (EB-10WS, a product by Matsunaga Chemical Co.)

D-2: modified epoxy-based flame retardant (EC-20, a product by Dai-nippon Ink Chemical Co)

D-3: a 1:1 by weight combination of an epoxy-based flame retardant (EC-36, a product by Dai-nippon Ink Chemical Co) and bis(tribromophenoxy) ethane (FF-680, a product by GLC Co.)

D-4: antimony trioxide (ATOX-S, a product by Nippon Seiko Co.)

EXAMPLES 1 TO 32

Pellets of a resin composition were prepared in each of these examples by dry-blending the respective ingredients shown in Table 1 excepting the glass fibers and the blend was kneaded at 240° C. in a double-screw extruder (Model TEM-35B) together with the glass fibers introduced from the side feeder of the extruder and the resin composition was extruded therefrom into pellets. The amount of each of the materials introduced into the extruder is shown in the table in parts.

The thus prepared pellets of the resin composition were dried at 80° C. for at least 6 hours and then injection-molded by using an injection molding machine to give test pieces for the measurements and evaluation of the properties. The results of the tests in these examples are shown in Table 2.

TABLE 1

| Example No. | (A) Copolymeric resin (parts) | (B) Elastomer (parts) | (C) Glass fibers (parts) | (D) Other additives (parts) |
|---|---|---|---|---|
| 1 | A-1 (100) | B-1 (7) | C-1 (30) | — |
| 2 | A-1 (100) | B-1 (7) | C-2 (30) | D-1 (12) D-4 (8) |
| 3 | A-1 (100) | B-1 (7) | C-2 (30) | D-2 (20) D-4 (8) |
| 4 | A-2 (100) | B-1 (7) | C-2 (30) | D-1 (12) D-4 (8) |
| 5 | A-2 (100) | B-1 (7) | C-1 (30) | — |
| 6 | A-2 (100) | B-1 (20) | C-1 (30) | — |
| 7 | A-2 (100) | B-2 (7) | C-1 (30) | — |
| 8 | A-2 (100) | B-2 (3) | C-1 (30) | — |
| 9 | A-1 (100) | B-1 (7) | C-2 (40) | D-1 (12) D-4 (8) |
| 10 | A-2 (100) | — | C-1 (30) | — |
| 11 | A-2 (100) | B-2 (45) | C-1 (30) | — |
| 12 | A-2 (100) | B-1 (7) | C-1 (2) | — |
| 13 | A-2 (100) | B-1 (7) | C-1 (100) | — |
| 14 | A-2 (100) | B-4 (7) | C-1 (30) | — |
| 15 | A-1 (94) | B-1 (6) | C-1 (35) | D-1 (10) D-4 (6) |
| 16 | A-1 (85) | B-1 (15) | C-1 (35) | D-1 (10) D-4 (6) |
| 17 | A-1 (94) | B-1 (6) | C-1 (45) | D-1 (10) D-4 (6) |
| 18 | A-1 (94) | B-1 (6) | C-1 (25) | D-1 (10) D-4 (6) |
| 19 | A-2 (90) | B-1 (10) | C-2 (25) | D-3 (20) D-4 (5) |
| 20 | A-2 (90) | B-1 (10) | C-2 (45) | D-2 (15) D-4 (5) |
| 21 | A-2 (94) | B-1 (6) | C-1 (30) | D-1 (10) D-4 (5) |
| 22 | A-1 (94) | B-3 (6) | C-1 (35) | D-1 (10) D-4 (6) |
| 23 | A-1 (100) | — | C-1 (35) | D-1 (10) D-4 (6) |
| 24 | A-1 (70) | B-1 (30) | C-1 (35) | D-1 (10) D-4 (6) |
| 25 | A-1 (94) | B-2 (6) | C-1 (35) | D-1 (10) D-4 (6) |
| 26 | A-1 (85) | B-2 (15) | C-1 (35) | D-1 (10) D-4 (6) |
| 27 | A-2 (94) | B-1 (6) | C-1 (5) | D-2 (13) D-4 (5) |
| 28 | A-2 (94) | B-1 (6) | C-1 (100) | D-2 (13) D-4 (5) |
| 29 | A-1 (90) | B-1 (10) | C-2 (35) | D-1 (2) D-4 (5) |
| 30 | A-1 (94) | B-1 (6) | C-2 (35) | D-1 (40) D-4 (5) |
| 31 | A-2 (94) | B-1 (6) | C-1 (35) | D-2 (15) D-4 (15) |
| 32 | A-1 (95) | B-4 (5) | C-1 (35) | D-1 (10) D-4 (6) |

TABLE 2

| Example No. | Occurrence of crazes | Flexural strength, kg/cm², at 23° C. | Flexural strength, kg/cm², at 100° C. | Molding shrinkage, % | Linear thermal expansion coefficient, × $10^{-5}$ cm/cm/° C. | Izod impact strength, kg.cm/cm | Flame retardancy | Flexural modulus, kg/cm² | Heat distortion temperature, °C. |
|---|---|---|---|---|---|---|---|---|---|
| 1 | A | 1420 | 1250 | 0.36 | 4.1 | 6.7 | — | | |
| 2 | A | 1280 | 1180 | 0.33 | 4.5 | 6.5 | V-0 | | |
| 3 | A | 1120 | 1050 | 0.31 | 4.2 | 6.5 | V-0 | | |
| 4 | A | 1360 | 1080 | 0.30 | 4.2 | 6.8 | V-0 | | |
| 5 | A | 1480 | 1310 | 0.34 | 4.1 | 7.2 | — | | |
| 6 | A | 1360 | 1090 | 0.38 | 4.9 | 8.5 | — | | |
| 7 | A | 1410 | 1200 | 0.32 | 4.4 | 7.6 | — | | |
| 8 | B | 1430 | 1060 | 0.32 | 4.3 | 7.1 | — | | |
| 9 | A | 1510 | 1370 | 0.30 | 3.6 | 7.0 | V-0 | | |
| 10 | C | 1280 | 860 | 0.31 | 4.0 | 6.5 | — | | |
| 11 | A | 920 | 710 | 0.41 | 5.1 | 8.4 | — | | |
| 12 | A | 870 | 350 | 0.46 | 7.2 | 2.9 | — | | |
| 13 | Pelletization failed due to difficulty in compounding | | | | | | | | |
| 14 | A | 1150 | 780 | 0.35 | 4.3 | 6.2 | — | | |
| 15 | | | | | | 6.3 | V-0 | 65,700 | 123 |
| 16 | | | | | | 7.3 | V-0 | 61,500 | 122 |
| 17 | | | | | | 7.3 | V-0 | 82,300 | 124 |
| 18 | | | | | | 6.2 | V-0 | 60,500 | 118 |
| 19 | | | | | | 7.2 | V-0 | 67,500 | 102 |
| 20 | | | | | | 7.4 | V-0 | 85,600 | 110 |
| 21 | | | | | | 6.5 | V-0 | 66,800 | 109 |
| 22 | | | | | | 6.1 | V-0 | 65,800 | 122 |
| 23 | | | | | | 4.5 | V-0 | 70,500 | 124 |
| 24 | | | | | | 7.4 | V-0 | 57,200 | 120 |
| 25 | | | | | | 5.9 | V-0 | 55,100 | 121 |
| 26 | | | | | | 6.7 | V-0 | 52,100 | 120 |
| 27 | | | | | | 5.1 | V-0 | 28,200 | 102 |
| 28 | Pelletization failed due to difficulty in compounding | | | | | | | | |

TABLE 2-continued

| Example No. | Occurrence of crazes | Flextural strength, kg/cm², at 23° C. | Flextural strength, kg/cm², at 100° C. | Molding shrinkage, % | Linear thermal expansion coefficient, × 10⁻⁵ cm/cm/° C. | Izod impact strength, kg.cm/cm | Flame retardancy | Flexural modulus, kg/cm² | Heat distortion temperature, °C. |
|---|---|---|---|---|---|---|---|---|---|
| 29 | | | | | | 6.3 | V-2 | 62,100 | 120 |
| 30 | | | | | | 5.0 | V-0 | 70,500 | 118 |
| 31 | | | | | | 5.2 | V-0 | 69,400 | 109 |
| 30 | | | | | | 5.3 | V-0 | 49,200 | 118 |

What is claimed is:

1. A synthetic resin composition which consists essentially of, as a blend:
   (A) 100 parts by weight of a copolymeric resin of styrene and maleic anhydride or maleimide, of which the molar fraction of the moiety of maleic anhydride or maleimide is in the range from 3 to 20%;
   (B) from 1 to 30 parts by weight of an elastomeric copolymer which is a copolymer of styrene, methyl methacrylate and butadiene containing from 5 to 50 weight percent of copolymerized styrene, and
   (C) from 5 to 80 parts by weight of glass fibers.

2. A synthetic resin composition which consists essentially of, as a blend:
   (A) 100 parts by weight of a copolymeric resin of styrene and maleic anhydride or maleimide, of which the molar fraction of the moiety of maleic anhydride or maleimide is in the range from 3 to 20%;
   (B) from 1 to 30 parts by weight of an elastomeric copolymer which is a copolymer of styrene, methyl methacrylate and butadiene containing from 5 to 50 weight percent of copolymerized styrene, and
   (C) from 5 to 80 parts by weight of glass fibers;
   (D) from 5 to 30 parts by weight of a bromine-containing organic compound as a flame retardant; and
   (E) from 2 to 15 parts by weight of antimony trioxide.

3. A chassis of an electric or electronic instrument which is a shaped body of a synthetic resin composition which consists essentially of, as a blend:
   (A) 100 parts by weight of a copolymeric resin of styrene and maleic anhydride or maleimide, of which the molar fraction of the moiety of maleic anhydride or maleimide is in the range from 3 to 20%;
   (B) from 1 to 30 parts by weight of an elastomeric copolymer which is a copolymer of styrene, methyl methacrylate and butadiene containing from 5 to 50 weight percent of copolymerized styrene, and
   (C) from 5 to 80 parts by weight of glass fibers.

4. A chassis of an electric or electronic instrument which is a shaped body of a synthetic resin composition which consists essentially of, as a blend:
   (A) 100 parts by weight of a copolymeric resin of styrene and maleic anhydride or maleimide, of which the molar fraction of the moiety of maleic anhydride or maleimide is in the range from 3 to 20%;
   (B) from 1 to 30 parts by weight of an elastomeric copolymer which is a copolymer of styrene, methyl methacrylate and butadiene containing from 5 to 50 weight percent of copolymerized styrene, and
   (C) from 5 to 80 parts by weight of glass fibers,
   (D) from 5 to 30 parts by weight of a bromine-containing organic compound as a flame retardant; and
   (E) from 2 to 15 parts by weight of antimony trioxide.

5. The synthetic resin composition as claimed in claim 1 wherein the molar fraction of the moiety of maleic anhydride or maleimide in the component (A) is in the range from 5 to 15%.

6. The synthetic resin composition as claimed in claim 1 wherein the weight fraction of the moiety of styrene in the component (B) is in the range from 10 to 30%.

7. The synthetic resin composition as claimed in claim 1 wherein the amount of the glass fibers as the component (C) is in the range from 20 to 60 parts by weight per 100 parts by weight of the component (A).

* * * * *